US009705735B2

United States Patent
Jain et al.

(10) Patent No.: US 9,705,735 B2
(45) Date of Patent: *Jul. 11, 2017

(54) SYSTEM AND METHOD USING RSVP HELLO SUPPRESSION FOR GRACEFUL RESTART CAPABLE NEIGHBORS

(71) Applicant: Alcatel Lucent, Boulogne-Billancourt (FR)

(72) Inventors: Pradeep G. Jain, Mountain View, CA (US); Kanwar D. Singh, Mountain View, CA (US); Santoshkumar Ramamurthy, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,575

(22) Filed: Feb. 9, 2016

(65) Prior Publication Data

US 2016/0164720 A1 Jun. 9, 2016

Related U.S. Application Data

(63) Continuation of application No. 13/722,152, filed on Dec. 20, 2012, now Pat. No. 9,294,343.

(Continued)

(51) Int. Cl.
*H04L 12/24* (2006.01)
*H04L 12/913* (2013.01)
(Continued)

(52) U.S. Cl.
CPC ...... *H04L 41/0686* (2013.01); *H04L 41/0654* (2013.01); *H04L 41/0659* (2013.01);
(Continued)

(58) Field of Classification Search
CPC ............. H04L 41/0668; H04L 41/0681; H04L 41/0686; H04L 41/0654; H04L 69/40;
(Continued)

(56) References Cited

U.S. PATENT DOCUMENTS 7,602,702 B1 10/2009 Aggarwal
7,680,028 B1 3/2010 Zamfir et al.
(Continued)

FOREIGN PATENT DOCUMENTS

CN 101087221 A 12/2007
JP 2006157716 A 6/2006
(Continued)

OTHER PUBLICATIONS

Katz et al., RFC 5880, "Bidirectional Forwarding Detection," Juniper Networks, ISSN: 2070-1721, Jun. 2010.*
(Continued)

*Primary Examiner* — Redentor Pasia
(74) *Attorney, Agent, or Firm* — Tong, Rea, Bentley & Kim, LLC (57) ABSTRACT

A system, method and apparatus adapting one or more routers or nodes in a network to operate in a first mode to exchange hello messages with neighboring nodes to indicate thereby active or live status, and to operate in a second mode to avoid the use of hello messages by opportunistically relying upon service or management protocols to convey active or live status.

20 Claims, 4 Drawing Sheets

Related U.S. Application Data (60) Provisional application No. 61/676,796, filed on Jul. 27, 2012.

(51) Int. Cl.
| | | |
|---|---|---|
| *H04L 12/707* | (2013.01) | |
| *H04L 12/751* | (2013.01) | |
| *H04L 12/803* | (2013.01) | |
| *H04L 12/703* | (2013.01) | |
| *H04L 12/723* | (2013.01) | |

(52) U.S. Cl.
CPC ........ *H04L 41/0668* (2013.01); *H04L 45/026* (2013.01); *H04L 45/22* (2013.01); *H04L 45/28* (2013.01); *H04L 45/50* (2013.01); *H04L 47/125* (2013.01); *H04L 47/724* (2013.01)

(58) Field of Classification Search
CPC ....... H04L 69/28; H04L 45/026; H04L 45/28; H04L 47/724
See application file for complete search history.

(56) References Cited

U.S. PATENT DOCUMENTS

| | | | |
|---|---|---|---|
| 7,852,778 B1 * | 12/2010 | Kompella | H04L 43/0811 |
| | | | 370/242 |
| 7,948,996 B2 | 5/2011 | Kompella | |
| 8,014,275 B1 | 9/2011 | Sundt et al. | |
| 8,243,587 B2 | 8/2012 | Darwish | |
| 8,521,896 B2 | 8/2013 | Liu | |
| 8,644,325 B2 | 2/2014 | Iovanna et al. | |
| 8,693,339 B2 | 4/2014 | So | |
| 8,797,886 B1 | 8/2014 | Kompella | |
| 8,902,780 B1 | 12/2014 | Hegde et al. | |
| 8,953,590 B1 | 2/2015 | Aggarwal et al. | |
| 2006/0092952 A1 | 5/2006 | Boutros et al. | |
| 2006/0140111 A1 | 6/2006 | Vasseur et al. | |
| 2006/0209716 A1 | 9/2006 | Previdi et al. | |
| 2007/0047469 A1 | 3/2007 | Vasseur et al. | |
| 2007/0070914 A1 | 3/2007 | Abigail | |
| 2007/0124453 A1 | 5/2007 | Slaughter et al. | |
| 2008/0069007 A1 | 3/2008 | Vasseur et al. | |
| 2008/0198751 A1 | 8/2008 | Li | |
| 2009/0010153 A1 | 1/2009 | Filsfils et al. | |
| 2009/0046723 A1 | 2/2009 | Rahman et al. | |
| 2009/0135841 A1 | 5/2009 | Vasseur et al. | |
| 2009/0207845 A1 | 8/2009 | Guan | |
| 2009/0225652 A1 | 9/2009 | Vasseur | |
| 2009/0238084 A1 | 9/2009 | Nadeau | |
| 2010/0142531 A1 | 6/2010 | Kansara et al. | |
| 2010/0169506 A1 | 7/2010 | Krzanowski et al. | |
| 2010/0208741 A1 | 8/2010 | Vasseur | |
| 2011/0090786 A1 * | 4/2011 | Liu | H04L 12/5695 |
| | | | 370/221 |
| 2012/0027013 A1 | 2/2012 | Napierala | |
| 2013/0232193 A1 | 9/2013 | Ali et al. | |

FOREIGN PATENT DOCUMENTS

| | | |
|---|---|---|
| JP | 2007312091 A | 11/2007 |
| WO | WO 2006/044217 A1 | 4/2006 |
| WO | WO 2009/078395 A1 | 6/2009 |
| WO | WO 2012/015582 A1 | 2/2012 |

OTHER PUBLICATIONS

Muley et al., "Methods for Efficient Multicast Delivery in MPLS Networks," APRICOT 2010 / APNIC 29, Mar. 2010, http://www.apricot.net/apricot2010/_data/assets/pdf_file/0003/18912/Operations_02_Methods-of-efficient-multicast-delivery-in-MPLS-networks_Pradeep-Jain.pdf.

International Search Report and Written Opinion for International Patent Application Serial No. PCT/US2013/051793, mailed Nov. 27, 2013, consisting of 8 unnumbered pages.

Aggarwal, et al., "Extensions to Resource Reservation Protocol—Traffic Engineering (RSVP-TE) for Point-to-Multipoint TE Label Switched Paths (LSPs)", RFC 4875, rfc4875.txt, May 2007, XP015052419.

Pan, et al., "Fast Reroute Extensions to RSVP-YE for LSP Tunnels," RFC 4090, rfc4090.txt, May 1, 2005, XP015041909.

International Search Report and Written Opinion for International Application No. PCT/US2013/050536, mailed Nov. 13, 2013, Alcatel-Lucent USA Inc., Applicant, 8 pages.

Katz D Ward Juniper Networks, "Bidirectional Forwarding Detection (BFD)," RFC 5880, rfc5880.txt, Internet Engineering Task Force, IETF; Standard, Internet Society (ISOC) 4, Rue Des Falaises CH—1205 Geneva, Switzerland, Jun. 1, 2010 (Jun. 1, 2010), pp. 1-49, XP015070820.

International Search Report and Written Opinion for International Application No. PCT/US2013/051697, mailed Nov. 7, 2013, Alcatel-Lucent USA Inc., Applicant, 8 pages.

Cristel Pelsser et al., "Path Selection Techniques to Establish Constrained Interdomain MPLS LPs," Jan. 1, 2006 (Jan. 1, 2006), Networking 2006, Networking Technologies, Services, and Protocols, Performance of Computer and Communication Networks, Mobile and Wireless Communications Systems Lecture Notes in Computer Science, LNCS, Springer, Berlin, DE, XP019030828, ISBN: 978-3-540-34192-5, pp. 209-220.

International Search Report and Written Opinion for International Application Serial No. PCT/US2013/050510, dated Oct. 29, 2013, consisting of 8 unnumbered pages.

* cited by examiner

SYSTEM AND METHOD USING RSVP HELLO SUPPRESSION FOR GRACEFUL RESTART CAPABLE NEIGHBORS

CROSS REFERENCE TO RELATED APPLICATIONS

This application is a continuation of U.S. patent application Ser. No. 13/722,152, filed Dec. 20, 2012, entitled SYSTEM AND METHOD USING RSVP HELLO SUPPRESSION FOR GRACEFUL RESTART CAPABLE NEIGHBORS, which claims the benefit of U.S. Provisional Patent Application Ser. No. 61/676,796, filed Jul. 27, 2012, entitled SYSTEM, METHOD AND APPARATUS FOR IMPROVED MPLS MANAGEMENT, which applications are hereby incorporated by reference herein in their entireties.

FIELD OF THE INVENTION

The invention relates generally to communication networks and, more specifically but not exclusively, to efficient detection and processing of neighbor node status information in communication networks.

BACKGROUND

Multiprotocol Label Switching (MPLS) enables efficient delivery of a wide variety of differentiated, end to end services. Multiprotocol Label Switching (MPLS) traffic engineering (TE) provides a mechanism for selecting efficient paths across an MPLS network based on bandwidth considerations and administrative rules. Each label switching router maintains a TE link state database with a current network topology. Once a path is computed, TE is used to maintain a forwarding state along that path.

In the case of deployment of MPLS Resource Reservation Protocol (RSVP) Inter Domain Traffic Engineering Label Switched Paths (TE LSPs), RSVP HELLO messages are initially exchanged between RSVP-capable routers such that an RSVP neighbor relationship is established.

To efficiently detect a nodal failure or restart, the HELLO messages are exchanged at a fairly regular interval on a per-neighbor basis. Having multiple interfaces/neighbors increases the number of HELLO messages that need to be exchanged, resulting in a significant control plane overhead. This control plane overhead is reduced by reducing the interval between HELLO message exchanges. However, this increased interval may result in a delayed failover (resulting in dropped traffic) or a delay in recognizing that an apparently failed node is back in operation (resulting in inefficient use of the restored node).

Within the context of some Point to Multi-Point (P2MP) Networks, various Border Gateway Protocol (BGP) extensions and procedures allow the use of Bidirectional Forwarding Detection (BFD) to provide fast detection and failover for upstream faults such as neighboring node failure. However, if an apparent neighboring node failure is simply a restart of the neighboring node, the propagation of upstream fault information will unnecessarily result in the removal of the restarting node from service for an extended period of time.

SUMMARY

Various deficiencies in the prior art are addressed by systems, methods and apparatus adapting one or more routers or nodes in a network to operate in a first mode to exchange hello messages with neighboring nodes to indicate thereby active or live status, and to operate in a second mode to avoid the use of hello messages by opportunistically relying upon service or management protocols to convey active or live status.

A method according to one embodiment comprises establishing a neighboring node relationship with one or more neighboring nodes using Resource Reservation Protocol (RSVP) HELLO message exchange; in a first mode of operation with respect to a neighboring node, using HELLO messages to determine that the neighboring node is in a failed state; and in a second mode of operation with respect to a neighboring node, using a Bi-directional Forwarding Detection (BFD) mechanism to determine that the neighboring node is in a failed state, the second mode of operation entered in response to HELLO suppression active indicia received from the neighboring node. In various embodiments, in response to the use of a Bi-directional Forwarding Detection (BFD) mechanism, HELLO suppression active indicia are transmitted toward one or more upstream neighboring nodes.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be described within the context of a communication network including a plurality of routers or nodes operating in a first mode to exchange hello messages with neighboring nodes to indicate thereby active or live status, and in a second mode to avoid the use of hello messages by opportunistically relying upon service or management protocols to convey active or live status.

Advantageously, the various embodiments provide a very low latency mechanism or protocol adapted to detect faults in a bidirectional path between two forwarding engines, including interfaces, data link(s) and/or forwarding engines. The mechanism or protocol is generally operable independent of media, data protocols and routing protocols.

Figure 1:
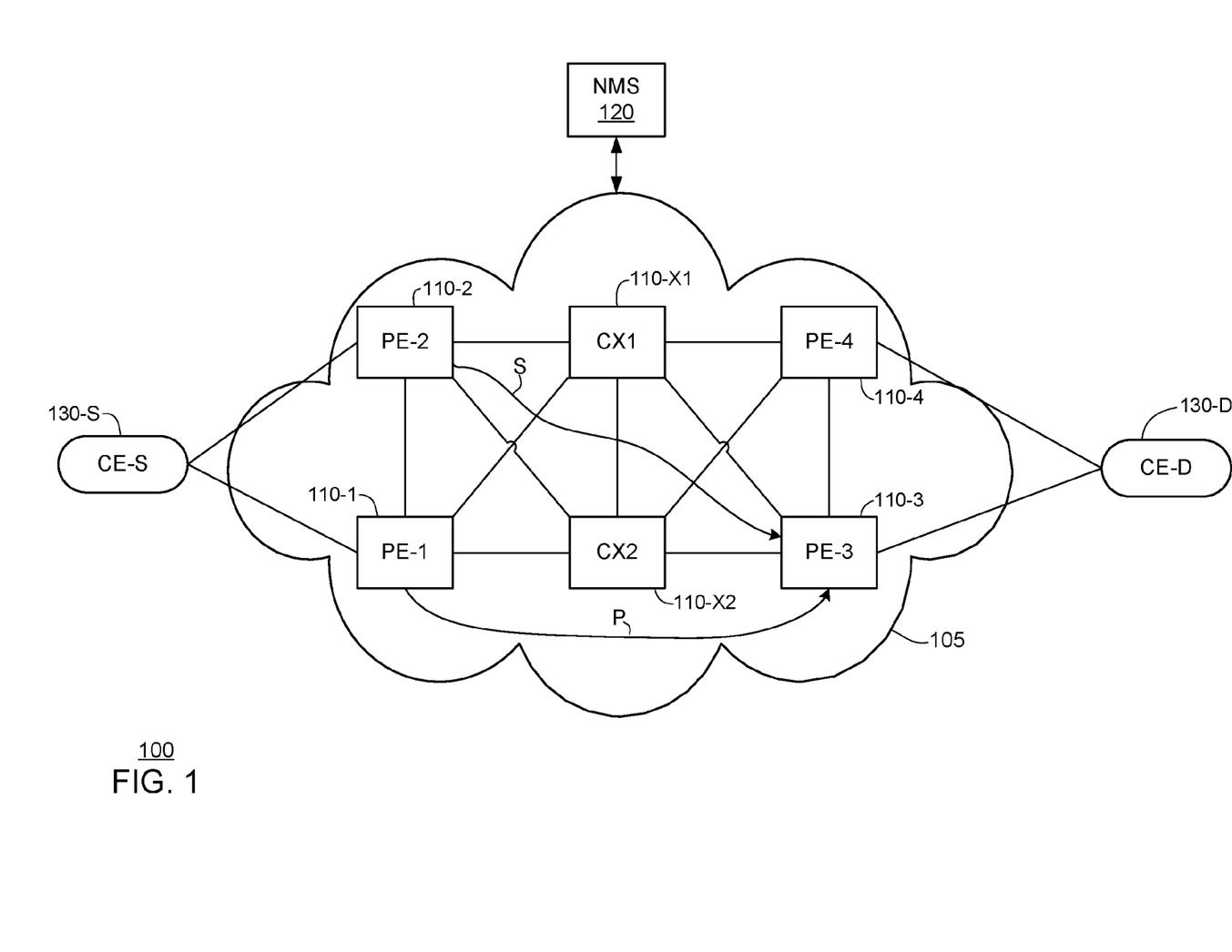
FIG. 1 depicts an exemplary network benefiting from the various embodiments.

FIG. 1 depicts a high level block diagram of a communication network architecture benefiting from various embodiments. Specifically, the architecture 100 of FIG. 1 provides a Multi-Protocol Label Switching (MPLS) network supporting Resource Reservation Protocol (RSVP) Inter Domain Traffic Engineering Label Switched Paths (TE LSPs) of type Contiguous LSP. The network may be modified by those skilled in the art to use other MPLS related protocols rather that the exemplary protocol discussed herein.

The architecture 100 includes an IP/MPLS communication network (CN) 105 and at least one network management system (NMS) 120. As depicted, NMS 120 is operative to control a plurality of routers 110 forming the CN 105. As depicted, the CN 105 comprises a plurality of Provider Edge (PE) routers 110-1 through 110-4, and a plurality of core routers 110-X1 and 110-X2. It will be noted that while only four PE routers are depicted, the CN 105 may include many more PE routers. Similarly, while only two core routers are depicted, the CN 105 may include many more core routers. The representation of the CN 105 is simplified for purposes of this discussion.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 3.

The NMS 120 and the various routers 110 operate to support Resource Reservation Protocol (RSVP) Inter Domain Traffic Engineering Label Switched Paths (TE LSPs) of type Contiguous LSP, such as defined in IETF Standards RFC4726 and RFC5151.

For purposes of the discussion it will be assumed that each directly connected router 110 establishes a neighboring node relationship with each other router 110 to which it is directly connected. Thus, each of the various routers 110 has associated with it a respective plurality of neighbor nodes. For example, each of the core routers 110-X1 and 110-X2 is depicted as being connected to each other as well as each of the PE routers 110-1 through 110-4. Similarly, PE routers 110-1 and 110-2 are depicted as being connected to each other as well as core routers 110-X1 and 110-X2.

To efficiently detect a nodal failure or restart, the HELLO messages are exchanged between neighboring nodes at predetermined intervals. Failure to receive such a message within the predetermined interval is an indication of a failure of the neighboring node that should have sent the message.

As depicted in FIG. 1, a point to multipoint (P2MP) traffic stream (e.g., a video or other data stream) is communicated from a source Customer Edge (CE) router 130-S to a destination CE router 130-D via one or both of primary and secondary label switched paths (LSPs); namely, primary path P and secondary path S. Primary path P originates at PE 110-1, traverses the core of CN 105 and terminates at PE 110-3. Secondary path S originates at PE 110-2, traverses the core of CN 105 and terminates at PE 110-3.

Thus, PE 110-3 operates as a dual homed leaf node sourcing traffic from two independent P2MP trees; namely, a primary LSP tree originating at Root Node PE 110-1 and a secondary LSP tree originating at Root Node PE 110-2.

The P2MP channels utilize Bidirectional Forwarding Detection (BFD) or similar mechanisms, such as provided in the various Border Gateway Protocol (BGP) and other extensions and procedures. In this manner, fast detection and failover for upstream faults such as neighboring node failure is provided.

In various embodiments, one or more of the routers 110 are adapted to operate in a first (unsuppressed) mode of operation to establish neighboring node relationships and periodically exchange hello messages with neighboring nodes to indicate thereby active or live status. In response to the establishment of a LSP utilizing a protocol including a BFD mechanism, one or more routers 110 are adapted to operate in a second (suppressed) mode of operation wherein active/live status of downstream neighboring nodes is determined using the BFD mechanism and the hello message exchange function is partially or fully suppressed.

The various embodiments discussed herein contemplate neighbor nodes opportunistically moving between the first and second mode of operation in response to network management requirements, BFD mechanism activation/inactivation and the like.

Figure 2:
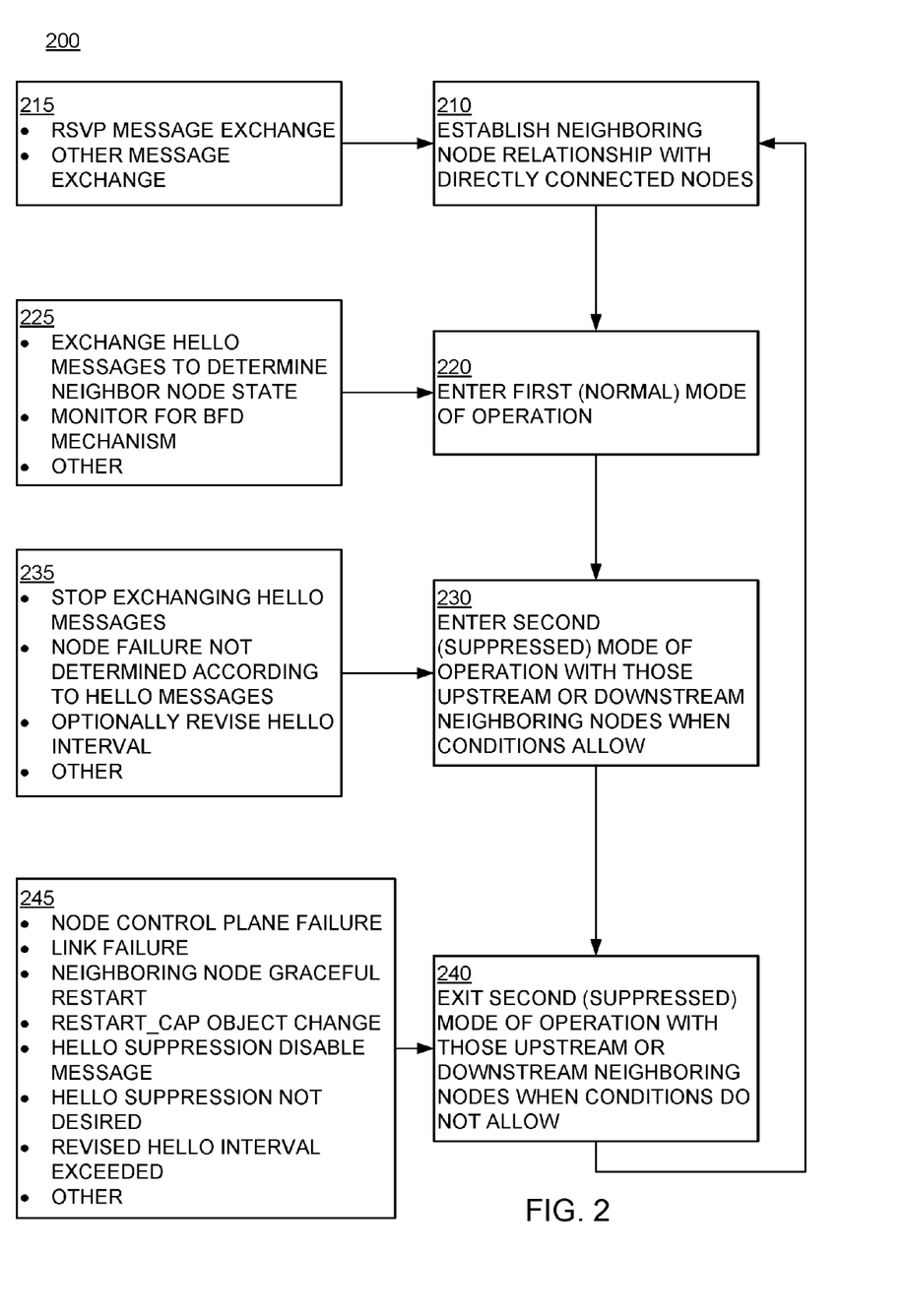
FIG. 2 depicts a flow diagram of a method according to one embodiment.

FIG. 2 depicts a flow diagram of a method according to one embodiment. Specifically, FIG. 2 depicts a method 200 for suppressing hello messages between neighboring nodes supporting a common LSP including a BFD mechanism. The method 200 is adapted for use some or all of a plurality of nodes within a communications network. As such, while the functionality of the method 200 will be described from the perspective of a single network node, it will be appreciated that each of a plurality of network nodes of the network may operate according to this functionality to achieve an opportunistically adaptive hello message suppression mechanism.

At step 210, the network node or router establishes a neighboring node relationship with other directly connected nodes or routers. That is, each of the nodes within the network interacts with directly connected nodes to establish mutual neighboring node relationships. Referring to box 215, this relationship may be established using RSVP message exchanges and/or other message exchanges.

At step 220, the network node enters a first or normal mode of operation in which hello message suppression is not used. Referring to box 225, hello messages continue to be exchanged with neighbor nodes to determine neighbor node state and/or other information. Further, the network node monitors the various paths it supports to determine if a BFD mechanism is utilized therein. As noted herein, neighboring network nodes supporting a common path using BFD may rely upon the BFD mechanism to identify node or link failures such that hello message exchanges may be avoided.

At step 230, the network node enters a second or suppressed mode of operation with upstream or downstream neighboring nodes as conditions allow. These conditions include an active BFD mechanism on a commonly supported path between the neighboring nodes, as well as a capability and desire of both nodes to operate in a hello suppression mode. Referring to box 235, hello messages are no longer exchanged between the neighboring nodes and node failure is no longer determined according to hello messages (i.e., whether a message was received within a predetermined time period).

At step 240, a second (suppressed) mode of operation is exited with those upstream or downstream neighboring nodes when conditions do not allow this mode of operation. Referring to box 245, the second or suppressed mode of operation is exited in response to any of (1) detection of a node control plane failure; (2) link failure; (3) neighboring node graceful restart; (4) Restart_Cap Object Change; (5) a Hello Suppression disable message; and/or other criteria/events. After exiting the second mode of operation, the network node returns to the first mode of operation upon restoration/restart of the neighboring node or link.

Various embodiments contemplate these operating modes between upstream/downstream neighboring nodes where a BFD mechanism exists to provide node or link failure information. Referring to FIG. 1, it can be seen that PE router 110-1 may enter into a suppressed mode of operation with respect to core router 110-X2 due to the BFD mechanism associated with the primary multicast path P. Similarly, PE router 110-1 may not enter into a suppressed mode of operation with respect to core router 110-X1 since a path associated with the BFD mechanism is not depicted as common to both routers.

Various embodiments contemplate an operating mode wherein a node receiving HELLO suppression active indicia from a downstream neighboring node transmits corresponding HELLO suppression active indicia toward one or more upstream neighboring nodes associated with said downstream neighboring node. Associated upstream nodes may comprise nodes sharing a LSP with the downstream node.

By opportunistically relying upon service or management protocols such as BFD to convey active or live status, resources normally allocated to keep alive hello message exchanges may be conserved. When used within the context of a network comprising a very large number of network elements, this conservation may become quite substantial.

Various embodiments adapt node operation to accommodate additional situations such as the neighbor node undergoing a Graceful Restart. Specifically, while having BFD enabled between neighbor nodes is sufficient to detect control plane failure, various embodiments provide additional interaction between upstream/downstream neighboring nodes to address the circumstances associated with neighboring node graceful restart and other situations. This additional interaction is provided using a hello suppression mechanism in which a Hello_Suppress object is included within or associated with HELLO messages communicated between neighbor nodes.

Thus, in various embodiments, a hello suppression mechanism is invoked between neighbor nodes after a session including a BFD mechanism is established (e.g., a RSVP BFD session). In particular, in various embodiments the hello suppression mechanism utilizes the Hello_Suppress object to communicate hello suppression enable/active, hello suppression disable/in active, hello suppression restore/modify and/or other information between neighboring nodes.

Hello_Suppress Object

In various embodiments a Hello_Suppress Object is carried in the HELLO messages only when Hello Suppression is enabled. For purposes of this discussion, it will be assumed that the format of the Hello_Suppress Object is provided as follows. However, those skilled in the art will readily appreciate that other and different formats may also be used to communicate the relevant information between neighboring nodes.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Length               | Class-Num(131)| C-Type  (1)   |
+-+-+-+-+-+-+-+-+-+-+-+-+-+-+-+-+-+-+-+-+-+-+-+-+-+-+-+-+-+-+-+-+
|     Hello Suppress REQUEST    |      Hello Suppress ACK       |
+-+-+-+-+-+-+-+-+-+-+-+-+-+-+-+-+-+-+-+-+-+-+-+-+-+-+-+-+-+-+-+-+
```

In particular, an exemplary Hello Suppress REQUEST has a length of 16 bits. If Hello Suppression is enabled on a node, the Hello Suppress REQUEST field will be set to (1). If Hello Suppression is enabled on a node but the RSVP BFD is down, the Hello Suppress REQUEST field will be set to (0).

Similarly, an exemplary Hello Suppress ACK as a length of 16 bits. If Hello Suppression is enabled on a node and a neighbor sends a Hello Suppress REQUEST, then the Hello Suppress ACK field will be set to (1). It is noted that the Hello Suppress ACK field will be set to (0) if the BFD session is down.

Figure 3:
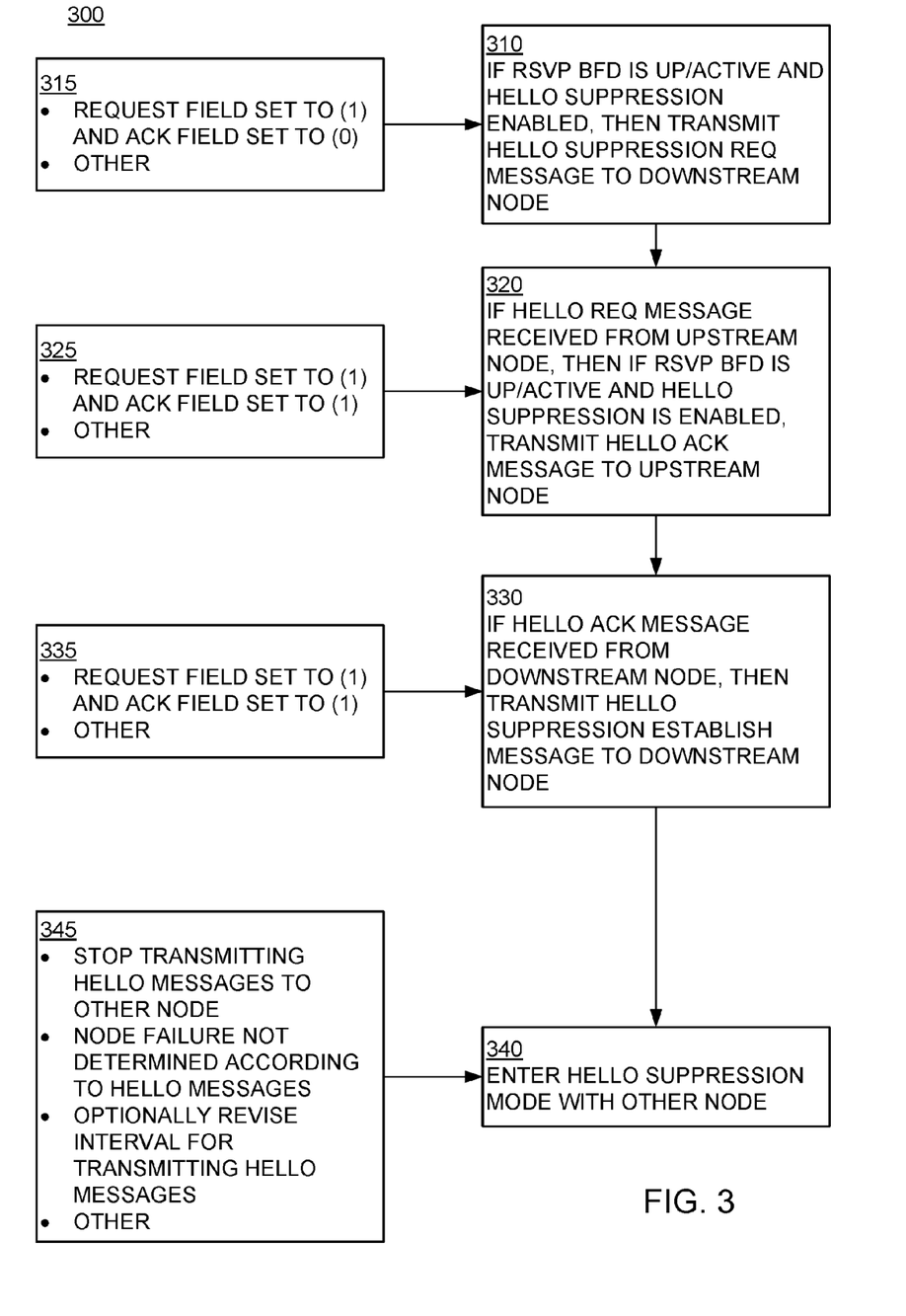
FIG. 3 depicts a flow diagram of a method according to one embodiment.

FIG. 3 depicts a flow diagram of a method according to one embodiment. Specifically, FIG. 3 depicts a method 300 for entering a hello message suppressing mode of operation with respect to neighboring nodes supporting a common LSP including a BFD mechanism. The method 300 is adapted for use some or all of a plurality of nodes within a communications network to provide thereby an adaptive hello message suppression mechanism.

For purposes of this discussion, assume that a first node R1 is upstream from a second and neighboring node R2. Each of the nodes R1 and R2 comprise MPLS capable routers within an IP-MPLS cloud, with RSVP BFD and HELLO messages enabled. Referring to FIG. 1, first and second nodes R1 and R2 may respectively comprise, illustratively, PE router 110-1 and core router 110-X2.

After establishing an MPLS LSP tunnel between the neighbors, the RSVP neighboring node status is active and the nodes start exchanging HELLO messages.

In various embodiments, entering a Hello Suppression mode of operation involves a 3-way handshaking procedure between the two neighbors, such as described below with respect to the various steps.

At step 310, a network element such as upstream node R1 determines if RSVP BFD is up/active and if Hello Suppression is enabled. If both conditions are true, then upstream node R1 transmits toward downstream node R2 a HELLO suppression Request (REQ) message. Referring to box 315, the hello suppression REQ message includes a Hello_Suppress Object with a REQUEST field set to (1) and a ACK field set to (0). Other bit settings or states may also be used to indicate that a hello suppression mode is requested between the two neighboring nodes.

At step 320, a network element such as downstream node R2 receives the hello suppression REQ message from upstream node R1 and determines if RSVP BFD is up/active and Hello Suppression is enabled. If both conditions are true, then node R2 responds to the message received from node R1 by transmitting toward node R1 a HELLO suppression acknowledgment (ACK) message. Referring to box 325, the hello suppression ACK message includes a Hello_Suppress Object with the REQUEST and ACK fields both set to (1). Other bit settings or states may also be used to indicate that a requested hello suppression mode between the two neighboring nodes is acknowledged.

At step 330, node R1 responds to the ACK message received from node R2 by transmitting toward node R2 a HELLO message adapted to establish or confirm hello suppression mode between the two nodes. Referring to box 335, the hello suppression establishment or confirmation message includes a Hello_Suppress Object with the REQUEST and ACK fields both set to (1). Other bit settings or states may also be used to indicate that hello suppression mode between the two neighboring nodes is established or confirmed.

At step 340, after the initial handshake procedure described above with respect to steps 310-335, both nodes R1 and R2 enter a Hello Suppression mode of operation with respect to each other. Referring to box 345, each of the nodes stopped transmitting hello messages to the other node, each of the nodes stops determining node failure conditions in response to the absence of otherwise expected hello messages. Other actions may also be taken as discussed herein. During this suppression mode of operation, the BFD mechanism is exclusively used to determine corresponding node or link failures.

The methods 200/300 described above with respect to FIGS. 2 and 3 contemplate opportunistically entering and exiting a hello suppression mode at one or more of a plurality of network elements. In particular, in various embodiments, the nodes will exit the Hello Suppression mode in response to (1) detection of a node control plane failure; (2) link failure; (3) neighboring node graceful restart; (4) Restart_Cap Object Change; (5) and/or a Hello Suppression disable message, illustratively as follows.

(1) A node control plane failure at node R2 will be detected at node R1 via the BFD mechanism. Node R1 will then invoke the currently used neighbor down procedures. When the RSVP control plane comes up on node R2, it will start sending HELLO messages again. The REQUEST field will be set to (1) only after node R2 detects that the RSVP BFD session has come up. The ACK field will be set to (0). The 3-way handshaking procedure described above will be used by the nodes to re-enter the Hello Suppression Phase. Values of the source and destination instances in the HELLO messages may be adapted according to, illustratively, the procedures described in IETF RFC 3209.

(2) A link failure between R1 and R2 will be detected on both the nodes via the BFD mechanism. On detecting the failure, both nodes will invoke the currently used neighbor down procedures. When the link comes up between the nodes, the 3-way handshaking procedure will be invoked once the RSVP BFD session is up. Values of the source and destination instances in the HELLO messages may be adapted according to, illustratively, the procedures described in IETF RFC 3209.

(3) After a restart of node R2 in which Graceful Restart is enabled, node R2 will send a HELLO message to node R1 including a Restart_Cap object. Nodes R1 and R2 will continue exchanging HELLO messages during the Restart Phases with the Hello_Suppress Object REQUEST and ACK fields set to (0).

On detecting completion of the Graceful Restart Phase, the nodes set their Hello_Suppress Object REQUEST field to (1) and the ACK field to (0). The nodes will then enter the 3-way handshaking phase to re-enter the Hello Suppression mode.

(4) After a restart of node R2 in which Graceful Restart is not enabled, node R2 will send a HELLO message to node R1 not including a Restart_Cap object. If R1 and R2 and already entered the Hello Suppression mode and Graceful Restart is enabled on node R1, then R1 will start re-sending the HELLO messages. The HELLO messages will carry the Restart_Cap Object as described in RFC 3473 and the Hello_Suppress Object with the REQUEST field set to (1) and ACK field set to (0).

The nodes may then re-enter the Hello Suppression Phase after the initial handshaking procedure. Generally speaking, the nodes should exit the Hello Suppression Phase as described above any time there is a change in the Restart_Cap Object.

(5) An explicit command to disable or exit hello suppression mode may be generated by a network manager, a particular node, a service provider or any other source given such authority. In response to receiving a hello suppression mode disable/exit command or message, node R1 (illustratively) will stop sending HELLO messages with the Hello_Suppress Object, and node R2 will start sending HELLO messages with the REQUEST field set to (1) and the ACK field set to (0). Similarly, upon enabling Hello Suppression on node R1, the nodes will re-enter the Suppression Phase after the 3-way handshaking process described above.

In various embodiments of the invention, rather than fully suppressing HELLO message exchanges the time interval within which failure to receive a HELLO message is indicative of a failed neighboring node is revised to a longer time interval. Revised time interval embodiments advantageously provide a mechanism for identifying neighboring node failure where failure of a relied upon BFD mechanism has occurred.

In various embodiments, the existing time interval is multiplied or increased by some factor to provide a revised time interval. In various embodiments, the revised time interval is specified directly. Data indicative of the revised time interval may be included within the various HELLO suppression indicia described herein.

Revised time interval embodiments operate in substantially the same manner as described above with respect to the various figures. One difference is that the method 200 of FIG. 2 is modified in that the second (suppressed) mode of operation is also exited at 240 (referring to box 245) in response to a failure to receive a HELLO message within a revised time interval. Similarly, the method 300 of FIG. 3 is modified in that the HELLO suppression mode of operation at step 340 further contemplates transmitting HELLO messages according to a revised interval schedule.

Figure 4:
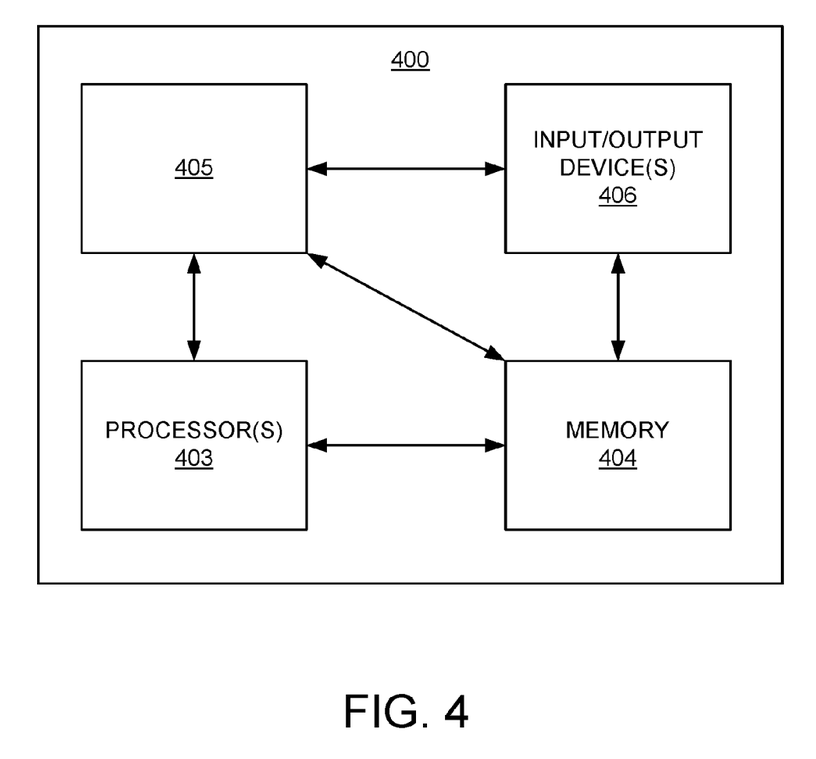
FIG. 4 depicts a high-level block diagram of a computer suitable for use in performing various functions described herein.

FIG. 4 depicts a high level block diagram of a computer suitable for use in performing functions described herein.

As depicted in FIG. 4, computer 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in a combination of software and hardware, e.g., using a general purpose computer, one or more application specific integrated circuits (ASIC), and/or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computer 400 depicted in FIG. 4 provides a general architecture and functionality suitable for implementing functional elements described herein or portions network of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims.

What is claimed is:

1. An apparatus, comprising:
a processor and a memory communicatively connected to the processor, the processor configured to:
receive, at a first node from a second node, a request message indicative of a request by the second node for the first node to enter a mode of operation in which a Bidirectional Forwarding Detection (BFD) mechanism is used for failure detection and use of Resource Reservation Protocol (RSVP) HELLO messages for failure detection is suppressed; and
propagate, from the first node toward the second node based on a determination that a BFD session is active between the first node and the second node and based on a determination that the first node is capable of operating in the mode of operation, a response message indicative that the first node accepts the request by the second node for the first node to enter the mode of operation.

2. The apparatus of claim 1, wherein the request message comprises an RSVP HELLO message including a Hello_Suppress Object having a REQUEST field set to a first state and an ACK field set to a second state.

3. The apparatus of claim 2, wherein the response message comprises an RSVP HELLO message including a Hello_Suppress Object having a REQUEST field set to the first state and an ACK field set to the first state.

4. The apparatus of claim 1, wherein the processor is configured to:
receive, at the first node from the second node, an acknowledgment message indicative of a confirmation that the second node is entering the mode of operation; and
enter the mode of operation at the first node.

5. The apparatus of claim 4, wherein the request message comprises an RSVP HELLO message including a Hello_Suppress Object having a REQUEST field set to a first state and an ACK field set to a second state, wherein the acknowledgment message comprises an RSVP HELLO message including a Hello_Suppress Object having a REQUEST field set to the first state and an ACK field set to the first state.

6. The apparatus of claim 4, wherein the processor is configured to:
enter the mode of operation at the first node; and
use the BFD session, at the first node, to monitor for a failure associated with the second node.

7. The apparatus of claim 1, wherein the processor is configured to:
based on a determination that a link between the first node and the second node is restored after a failure of the link and based on a determination that the BFD session is active between the first node and the second node, initiate a process for entering the mode of operation.

8. The apparatus of claim 1, wherein the processor is configured to:
detect a restart of the first node;
enter a graceful restart phase at the first node, where the first node is configured to exchange RSVP HELLO messages with the second node during the graceful restart phase; and
based on a determination that the graceful restart phase is complete, initiate a process for entering the mode of operation.

9. The apparatus of claim 1, wherein the processor is configured to:
detect a restart of the first node;
propagate, from the first node toward the second node, an RSVP HELLO message, wherein the RSVP HELLO message excludes a Restart_Cap object; and
receive, at the first node from the second node, an RSVP HELLO message including the Restart_Cap object and indicative of a request by the second node to reenter the mode of operation.

10. A method, comprising:
receiving, at a first node from a second node, a request message indicative of a request by the second node for the first node to enter a mode of operation in which a Bidirectional Forwarding Detection (BFD) mechanism is used for failure detection and use of Resource Reservation Protocol (RSVP) HELLO messages for failure detection is suppressed; and
propagating, from the first node toward the second node based on a determination that a BFD session is active between the first node and the second node and based on a determination that the first node is capable of operating in the mode of operation, a response message indicative that the first node accepts the request by the second node for the first node to enter the mode of operation.

11. An apparatus, comprising:
a processor and a memory communicatively connected to the processor, the processor configured to:
propagate, from a first node toward a second node, a response message indicative that the first node accepts a request by the second node for the first node to enter a mode of operation in which a Bidirectional Forwarding Detection (BFD) mechanism is used for failure detection and use of Resource Reservation Protocol (RSVP) HELLO messages for failure detection is suppressed;
receive, at the first node from the second node, an acknowledgment message indicative of a confirmation that the second node is entering the mode of operation; and
enter the mode of operation at the first node based on the acknowledgment message from the second node.

12. The apparatus of claim 11, wherein the request is indicative that the second node is capable of operating in the mode of operation.

13. The apparatus of claim 11, wherein the request is received as a request message from the second node.

14. The apparatus of claim 13, wherein the request message comprises an RSVP HELLO message including a Hello_Suppress Object having a REQUEST field set to a first state and an ACK field set to a second state.

15. The apparatus of claim 14, wherein the response message comprises an RSVP HELLO message including a Hello_Suppress Object having a REQUEST field set to the first state and an ACK field set to the first state.

16. The apparatus of claim 15, wherein the acknowledgment message comprises an RSVP HELLO message including a Hello_Suppress Object having a REQUEST field set to the first state and an ACK field set to the first state.

17. The apparatus of claim 11, wherein the processor is configured to:
use, at the first node, a BFD session between the first node and the second node to monitor for a failure associated with the second node.

18. The apparatus of claim 11, wherein the processor is configured to:
based on a determination that a link between the first node and the second node is restored after a failure of the link and based on a determination that a BFD session is active between the first node and the second node, initiate a process for entering the mode of operation.

19. The apparatus of claim 11, wherein the processor is configured to:
detect a restart of the first node;
enter a graceful restart phase at the first node, where the first node is configured to exchange RSVP HELLO messages with the second node during the graceful restart phase; and
based on a determination that the graceful restart phase is complete, initiate a process for entering the mode of operation.

20. The apparatus of claim 11, wherein the processor is configured to:
detect a restart of the first node;
propagate, from the first node toward the second node, an RSVP HELLO message, wherein the RSVP HELLO message excludes a Restart_Cap object; and
receive, at the first node from the second node, an RSVP HELLO message including the Restart_Cap object and indicative of a request by the second node to reenter the mode of operation.

* * * * *